[2.]
E. R. Sumner. Post-hole Digger.

No. 118,560. Patented Aug. 29, 1871.

Witnesses:
E. Wolff.
Wm. H. C. Smith.

Inventor:
E. R. Sumner.
per
Attorneys.

UNITED STATES PATENT OFFICE.

EDWARD R. SUMNER, OF FREEPORT, ILLINOIS.

IMPROVEMENT IN POST-HOLE DIGGERS.

Specification forming part of Letters Patent No. 118,560, dated August 29, 1871.

*To all whom it may concern:*

Be it known that I, EDWARD R. SUMNER, of Freeport, in the county of Stephenson and State of Illinois, have invented a new and Improved Post-Hole Digger; and I do hereby declare that the following is a full, clear, and exact description thereof, which will enable others skilled in the art to make and use the same, reference being had to the accompanying drawing forming part of this specification.

My invention consists in improving post-hole diggers, as hereinafter fully described and subsequently pointed out in the claim.

Figure 1:
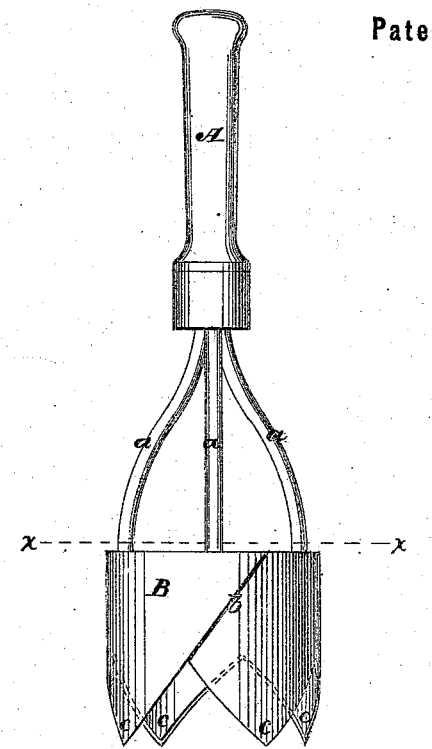
Figure 2:
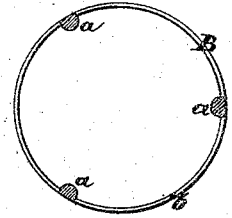
Figure 3:
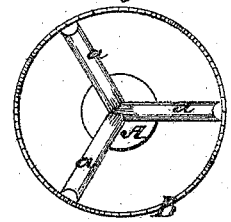

Figure 1 is a side elevation of my improvement, showing the angle of the diagonal joint and the diagonal or serrated cutting-teeth or knives. Fig. 2 is a cross-section through the line $x$ $x$ in Fig. 1. Fig. 3 is a plan view of the digger when upturned.

Similar letters of reference indicate corresponding parts.

In the drawing, A is the handle of the instrument, from which project arms $a$, to which the blade of the digger B is attached. The blade B is made of thin elastic metal, in the form of a circular sheet, the edges of which are brought together with an inclined or diagonal joint or opening, $b$. The ordinary diggers have a straight or vertical opening, within which roots or other obstructions are apt to enter, on the descent of the digger, and become jammed or lodged in the joint, preventing the proper operation of the tool. By making the joint inclined or diagonal, as in my improvement, this difficulty is overcome, as the obstructions cannot enter the opening, but are cut off or pushed downward by the descent of the blade. The lower portion or cutting-edge of the digger-blade is provided with a series of diagonal or serrated cutting-teeth, $c$, having sharpened edges. These teeth, by their pointed and wedge-shaped form, easily enter and cut through the soil, also through turf, roots, &c.

A digger provided with cutting-teeth of the above form will have obvious advantages for working in almost any kind of ground, but especially in thick or tenacious soils, or those containing turf or roots. The usual form of the cutting-edge is horizontal or straight, but by the use of serrated teeth, as in my improvement, the extent of the cutting-surface is much increased, the efficiency of the tool improved, and its operation rendered easier and quicker. The serrated teeth, by their flexibility or elasticity, will bind on the earth contained within the digger, and thus hold the earth securely while the digger and its load are being raised. The arms $a$ rise vertically for a short distance above the blade B, and then converge into the handle A, as shown. This vertical rise of the arms affords free opportunity for the blade to sink in the earth and permit the soil or turf to rise above the top of the blade, where the turf or soil will be slightly pressed and held during the removal of the tool with its load from the ground.

I do not limit or confine myself to the exact form of any of the parts herein described, as they may be varied without departing from my invention.

Having thus described my invention, I claim as new and desire to secure by Letters Patent—

1. A blade, B, of a post-hole digger, formed of a single piece of metal bent into a circular form, and having sharpened teeth, $c$, on its lower edge to enable it to move freely through earth and roots, as specified.

2. A blade, B, having its edges joined together upon an oblique or diagonal line, $d$, to prevent clogging, as specified.

EDWARD R. SUMNER.

Witnesses:
CHANCELLOR MARTIN,
HENRY BILLKER.